Figure 3:
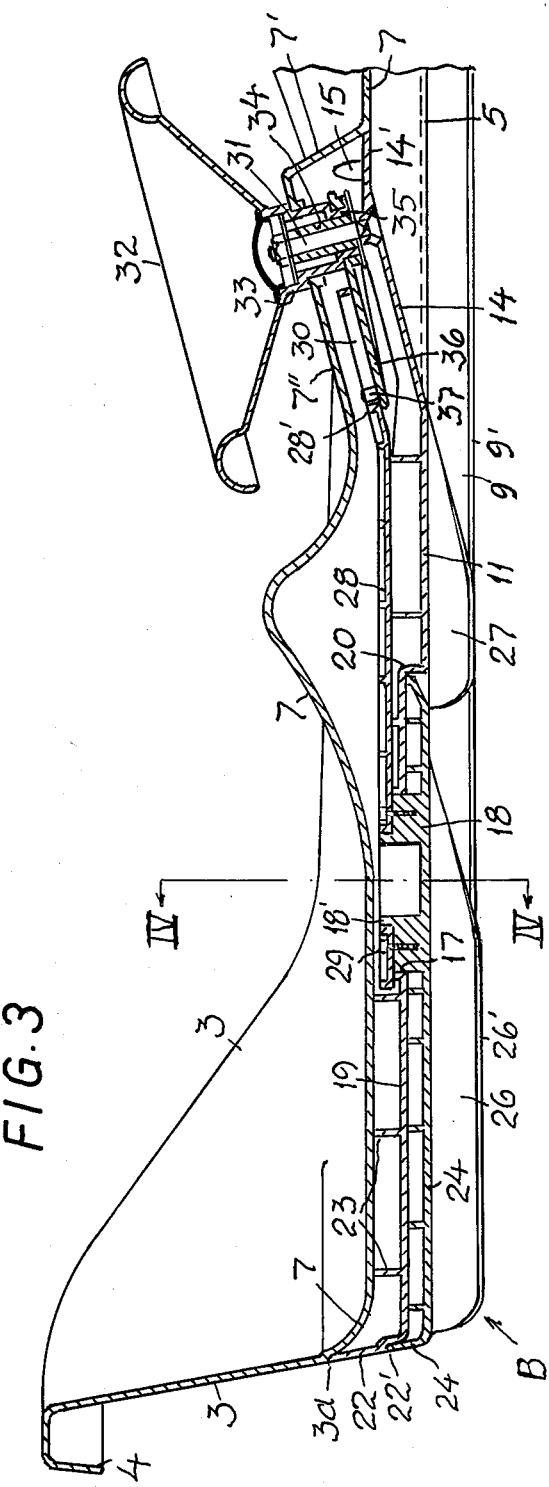

United States Patent [19]

Lund

[11] 4,077,638

[45] Mar. 7, 1978

[54] ARRANGEMENT IN STEERABLE SLIDE-TRAYS

[76] Inventor: Olav Gerhard Lund, Hovinveien 9B, Oslo 5, Norway

[21] Appl. No.: 668,740

[22] Filed: Mar. 19, 1976

[30] Foreign Application Priority Data

Apr. 2, 1975 Norway .................... 751129

[51] Int. Cl.² .......................................... B62B 13/10
[52] U.S. Cl. ................................. 280/21 R; D12/10
[58] Field of Search ............... 280/18, 21 R, 22; 9/310 B; 115/70; D12/10, 11

[56] References Cited

U.S. PATENT DOCUMENTS

| | | | |
|---|---|---|---|
| 2,276,310 | 3/1942 | James | 280/21 R X |
| 2,829,902 | 4/1958 | Stocker | D12/11 X |
| 2,910,708 | 11/1959 | Albright | 280/18 X |
| 3,169,779 | 2/1965 | Haab | 280/18 |
| 3,510,144 | 5/1970 | Casadei | 280/21 R |
| 3,677,568 | 7/1972 | Nelson | 280/21 R |
| 3,788,661 | 1/1974 | Hird | 280/22 |

Primary Examiner—Joseph F. Peters, Jr.
Assistant Examiner—Michael J. Forman

[57] ABSTRACT

A steerable slide-tray (toboggan) for sledding on snow, having a bottom part in which there is provided a recess at the rearward part of the bottom, for receiving a steering member which is rotatably mounted and operatively connected by way of a connecting means to a steering wheel positioned in front of a seating portion of the tray. A support member with the steering member, connecting means and steering wheel mounted thereon, is releasably secured across a channel-shaped portion extending upwards from the bottom of the tray, said channel-shaped portion comprising a laterally widened rearward part of a channel extending along the whole length of the slide-tray.

4 Claims, 5 Drawing Figures

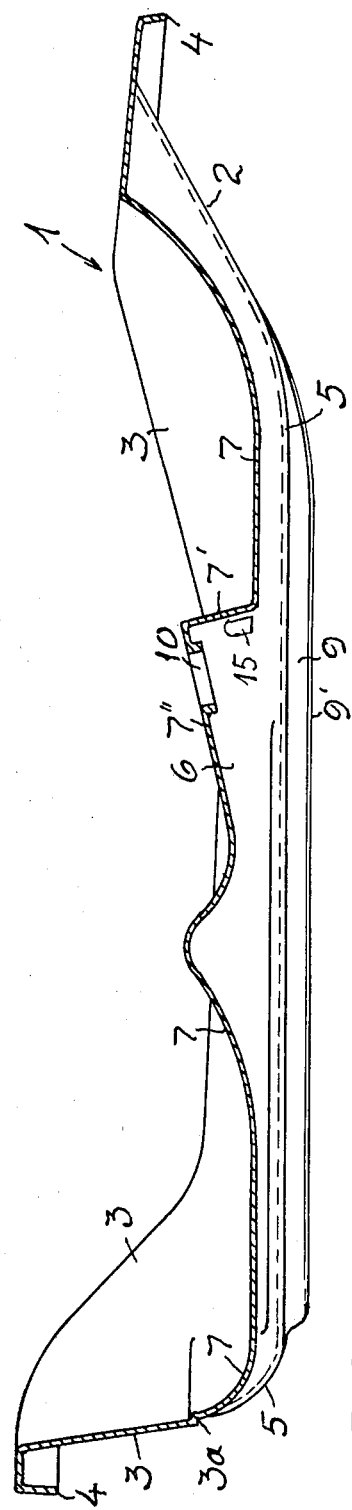
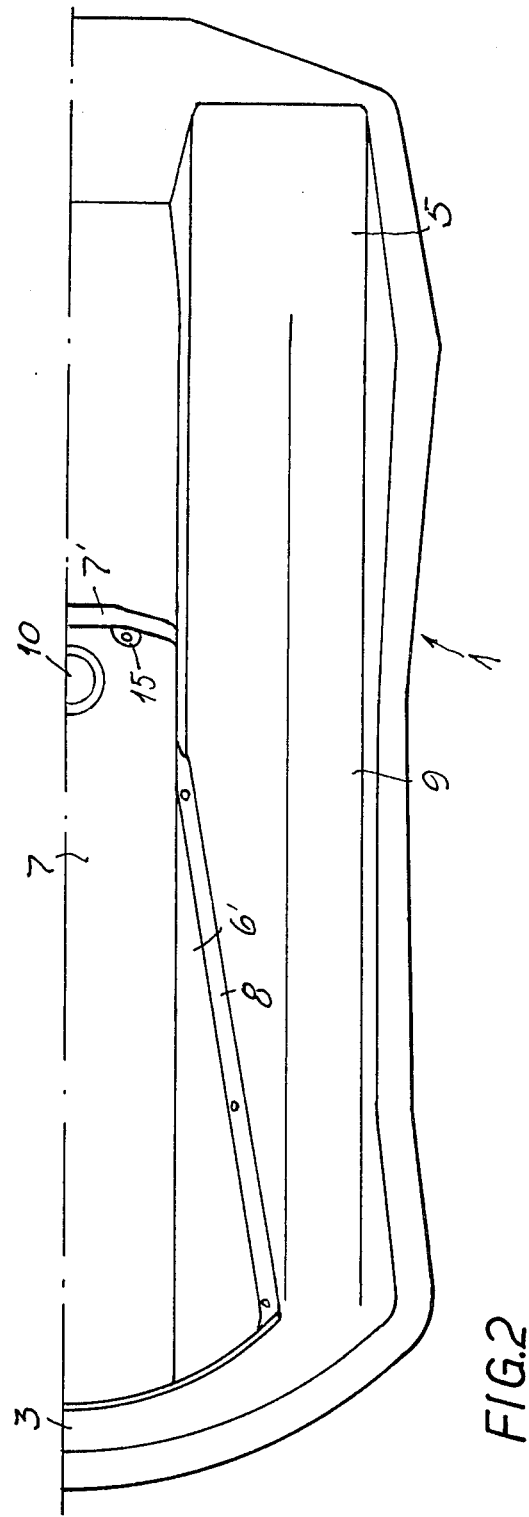

ARRANGEMENT IN STEERABLE SLIDE-TRAYS

The present invention relates to a steerable slide tray of the type comprising a bottom part with a seating portion, a front part curved upwards from the bottom part and a side wall extending around the remaining periphery of the bottom part, a recess being provided in the rearward part of the bottom for receiving a steering member operatively connected by way of a connecting means to a steering wheel positioned in front of the seating portion.

As known, such slide trays or toboggans are used for sledding on snow. In use slide trays of the above mentioned type have shown to possess the intended steering properties. However, with respect to manufacturing and general application they have certain drawbacks in that fixed members or portions of the slide tray itself form part of the steering gear, so that the slide tray can only be used with the steering gear mounted thereon. Further, the design implies that a relatively large sliding face is formed on the bottom of the slide tray.

The object of the present invention is to provide a slide tray with a steering gear of such a construction that the slide tray may be manufactured in a form which makes it usable as a common slide tray, without steering gear, or with a steering gear according to the invention.

For the achievement of the above mentioned object there is provided a slide tray of the type set forth above wherein, according to the invention, the steering member together with the connecting means and the steering wheel are mounted on a support plate releaseably secured across a channel-shaped portion extending upwards from the bottom part of the tray.

Figure 4:
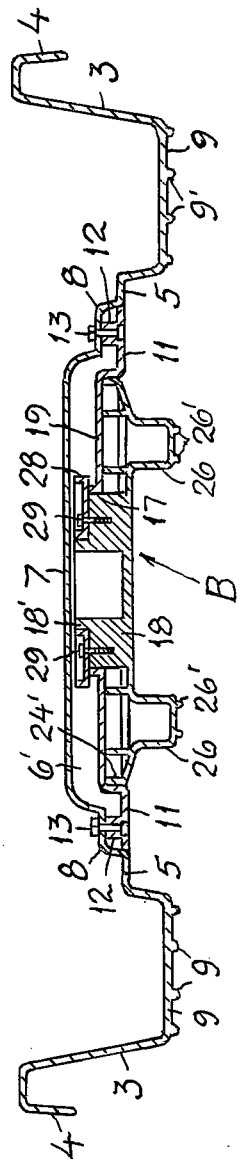
Figure 5:
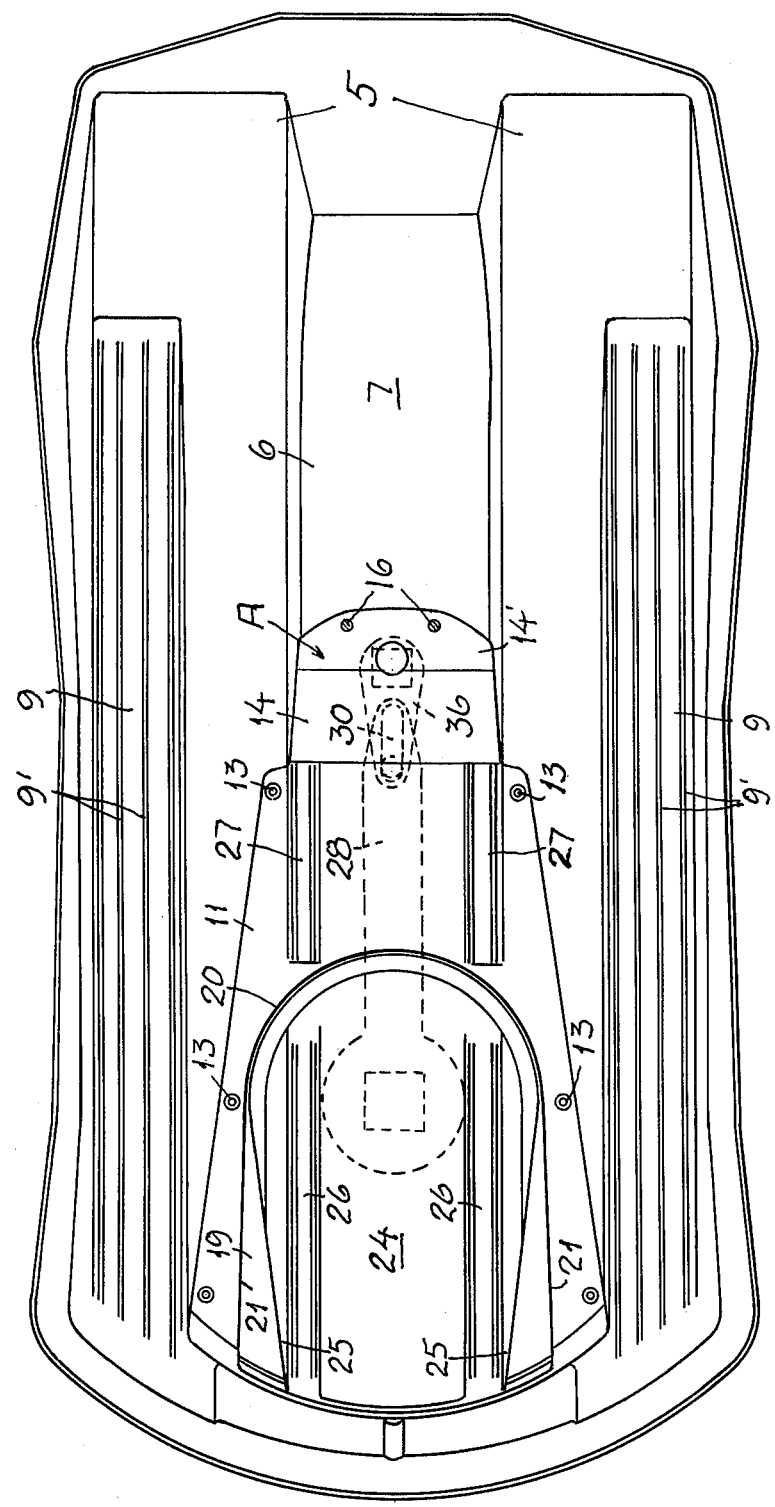

An embodiment of the invention will now be described by way of example with reference to the accompanying drawings, wherein FIG. 1 is a longitudinal cross-section of a slide tray according to the invention, without any steering gear, FIG. 2 is a plan view of one half of the slide tray in FIG. 1, viewed from the underside, FIG. 3 is an enlarged longitudinal cross-section of the rear part of the slide tray with a steering gear according to the invention mounted thereon, FIG. 4 is a cross-section along the line IV — IV in FIG. 3, and FIG. 5 is a plan view of the lower side of the slide tray with the steering gear mounted thereon.

In the drawings reference numeral 1 denotes an essentially rectangular slide tray which is made of a suitable plastic material and having an upwards curved front part 2 and a slightly upwards inclined side wall 3 extending around the periphery and having an upper, outwards bent rim 4. Centrally and longitudinally of the bottom part 5 of the tray there is formed a channel 6 extending upwards from the bottom and having an upper delimiting wall 7, said channel having a forward portion with relatively small width and a rearward portion 6' widening itself with gradually increasing width towards the rear end of the tray. The widened portion 6' of the channel is joined to the bottom 5 of the tray by angularly stepped side walls 8.

Further, at each side of the bottom 5 of the tray and adjacent to the side walls 3, there are formed depending, channel-shaped runners 9 constituting the main sliding surfaces of the tray and which may be provided with longitudinally extending, relatively low ribs 9'.

For the mounting of the steering wheel of the tray the upper wall 7 of the channel 6 is provided with an elevated or raised, angular portion comprising an upwards directed portion 7' adjoining a plane surface portion 7" extending perpendicularly to the axis of the steering wheel and wherein there is formed a bearing opening 10 for rotatable mounting of the steering wheel such as described later.

The slide tray so far described with reference to FIGS. 1 and 2, constitutes a common slide tray satisfying the requirements to such a slide tray, and the central, longitudinally extending channel 6 does not cause any obstructing or breaking effect with the shown form of the channel above the runners 9.

As a result of the above construction of the slide-tray a steering device can be mounted thereon in a simple and easy manner as shown in FIGS. 3 – 5.

The steering device comprises a support member or plate, generally designated A, comprising a rearward plate portion 11 having a shape which fits exactly in the opening in the widened or enlarged channel portion 6' in the bottom part 5 of the tray, and which is provided with list-shaped portions 12 along its side edges for abutment against horisontal portions of the angularly stepped side walls 8 to which a plate portion 11 is attached by means of screws 13. The height of the list-shaped portions 12 is such that the plate portion 11 is on a level with the bottom part 5 of the tray. At its front end the plate portion 11 is provided with an extension of a width adapted to the channel section and having a first portion 14 sloping upwards parallel to the upper wall portion 7" of the channel, and thereafter an end portion 14' which is on a level with and abuts against the wall 7 as shown in FIG. 3. The end portion 14' rests against projections 15 provided on the inside of the inclined portion 7' of the wall 7 and to which it is secured by means of screws 16.

In the central area of the plate portion 11 the support plate A is provided with a flanged opening 17 for the reception of a corresponding pivot 18 on a steering member, generally designated B. Said opening 17 is formed in an upwards bent or elevated portion 19 of the plate portion 11, which elevated portion 19 forms a recess defined by a forward semi-circle 20 and backwards directed, somewhat diverging side portions 21, and at its rear end the plate portion 11 has an upstanding, arcuate wall 22 having its centre of curvature in the axis of the pivot 18, and the upper edge of which is adapted to abut against a step or ledge 3a in the rearward sidewall 3, arranged at the joint between the upwards bent wall 7 and the side wall 3 as shown in FIGS. 1 and 3. The support plate A is also supported against the wall 7 by means of suitably positioned supporting ribs 23.

The steering member B comprises a plate member 24 formed with the pivot 18 and limited by an upwards projecting edge wall 24' forming at its front end a semi-circle about the axis of the pivot 18, adapted to rotate in the semi-circular portion 20 of the recess 19 in the plate portion 11, and side walls 25 converging towards the rear end of the plate portion 11 so that free spaces are left between each side wall 25 and the side walls 21 of the recess 19, which spaces allow the necessary lateral rotation of the steering member B for steering purposes. At its rear end the plate member 24 is bent upwards at 24' and is received in a cut-out 22' in the rearward upstanding wall 22 of the support plate A, whereby the plate member is guided during its rotation. On its upper side the plate member 24 is provided with transversely and longitudinally extending stiffening ribs against the recess 19 of the support plate.

On each side of the pivot 18 the steering member B is formed with longitudinally extending, short runner parts 26 provided on their lower sides with steering ribs 26′ which preferably project somewhat below the ribs 9′ on the runners 9. As shown in FIG. 3, similar runner parts 27 with ribs are provided on the front part of the plate portion 11 of the support plate A.

The rotating or swinging movement of the steering member B is provided by means of a forward directed arm or lever 28 secured on a preferably square end 18′ of the pivot 18 by means of screws 29 which simultaneously serve to retain the steering member B in the recess 19. At its front end the lever 28 has an upwards inclined portion 28′ extending parallel to the forward inclined portion 14 of the support plate A and having a longitudinally extending slot 30.

At the junction between the foremost portions 14, 14′ of the support plate A a shaft 31 is secured in such a position that it extends through the opening 10 in the upper wall portion 7″ of the channel 6 and coincides with the axis of said opening. A steering wheel 32 is formed with a stepped sleeve 33 by means of which it is rotatably mounted around a spacer sleeve 34 on the shaft 31. The lower end of the stepped sleeve 33 has a square peg 35 on which there is mounted a lever 36 extending below the inclined portion 28′ of the lever 28 and having a pin 37 projecting upwards into the longitudinal slot 30. The lever 36 and the stepped sleeve 33 are held together on the shaft 31 between upper and lower clamping discs by means of a nut threaded on to the shaft.

From the above description it will be appreciated that the invention provides a steering gear for slide trays which in a simple way can be releasably mounted on the slide tray in that the entire steering gear is mounted on a separate supporting plate A which in the described manner is secureable across a widened portion of a channel projecting upwards from and extending longitudinally of the bottom of the tray.

As it will be readily understood, a plurality of modifications and changes may be made in the described embodiment without departing from the scope of the invention.

What I claim is:

1. A steerable slide-tray comprising a bottom part having a seating portion, a front part curved upwards from the bottom part, and a side wall extending around the remaining periphery of the bottom part, a channel-shaped portion extending longitudinally of the bottom part and extending upwardly with respect thereto, said channel-shaped portion comprising a rearward, laterally widened portion of a channel having an upper wall and side walls extending along the whole length of said bottom part, said upper channel wall having an elevated angular portion with an inclined part in which there is provided an opening, a support plate releasably secured in said channel shaped portion comprising a rearward plate portion corresponding to said widened channel portion and secured to the side walls thereof on a level with said bottom part, and a forward plate portion having a width corresponding to the width of said channel and of which a first part is parallel to said inclined part of said angular portion of said upper channel wall and a second part of which is an end part on a level with said upper wall and is secured thereto at said angular portion, a recess provided in said rearward support plate portion extending upwardly with respect to said bottom part, a rotatable steering member received in said recess and provided with steering ribs, a steering wheel located in front of said seating portion, and a connecting mechanism for operatively connecting said steering member to said steering wheel, said steering member together with said connecting mechanism and steering wheel being mounted on said support plate with said steering wheel being mounted in said opening in said inclined part of said upper channel wall.

2. A steerable slide-tray according to claim 1, wherein the rear end of the support plate has an upwards directed, arcuate portion adapted to contact a corresponding ledge in the rearward side wall of the bottom part.

3. A steerable slide-tray according to claim 1, wherein the steering member is rotatably mounted in an elevated portion of the support plate by means of a pivot on which, at the upper side of said elevated portion, there is secured an end of a first lever extending forwards and having at its front end a part which is parallel to said first part of the support plate and is provided with a slot slidably receiving a pin on the free end of a second lever which lever is secured on a steering wheel sleeve rotatably mounted on a shaft secured to said first part of the forward plate portion of the support plate.

4. A steerable slide-tray according to claim 1, wherein the support plate at the front part of the rearward plate portion is provided with depending short runner portions having ribs on the lower sides thereof.

* * * * *